United States Patent
Park (10) Patent No.: US 9,608,673 B2
(45) Date of Patent: Mar. 28, 2017

(54) TRANSMITTER AND METHOD OF PROCESSING TRANSMISSION SIGNALS

(71) Applicant: Chang-Joon Park, Gyeonggi-do (KR)

(72) Inventor: Chang-Joon Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/864,374

(22) Filed: Sep. 24, 2015

(65) Prior Publication Data

US 2016/0087656 A1 Mar. 24, 2016

(30) Foreign Application Priority Data

Sep. 24, 2014 (KR) .................... 10-2014-0127660

(51) Int. Cl.
| | |
|---|---|
| *H04B 1/04* | (2006.01) |
| *H04M 1/00* | (2006.01) |
| *H04B 1/00* | (2006.01) |
| *H04W 88/06* | (2009.01) |

(52) U.S. Cl.
CPC ............ *H04B 1/006* (2013.01); *H04B 1/0067* (2013.01); *H04W 88/06* (2013.01)

(58) Field of Classification Search
CPC .......... H04B 1/005; H04B 1/006; H04B 1/40; H04B 1/0483; H04B 1/44; H04B 1/401; H04B 1/406; H04B 2001/0408; H03F 1/0277; H03F 3/189; H03F 3/195; H03F 3/211; H03F 2200/111; H03F 2200/451; H04W 88/02; H04W 88/06
USPC ....... 455/78, 83, 127.1, 127.2, 127.3, 127.4, 455/168.1, 552.1, 553.1; 370/277, 278, 370/279, 280, 281, 294, 295
See application file for complete search history.

(56) References Cited

U.S. PATENT DOCUMENTS

| | | | | |
|---|---|---|---|---|
| 7,119,614 | B2* | 10/2006 | Ichitsubo | H03F 1/0261 330/285 |
| 8,923,168 | B2* | 12/2014 | Mikhemar | H04B 1/18 370/276 |
| 2007/0161358 | A1* | 7/2007 | Bogdan | H04B 1/005 455/168.1 |
| 2009/0201084 | A1 | 8/2009 | See et al. | |
| 2010/0210208 | A1 | 8/2010 | Gorbachov | |

(Continued)

FOREIGN PATENT DOCUMENTS

KR 10-2004-0020209 A 3/2004

*Primary Examiner* — Quochien B Vuong
(74) *Attorney, Agent, or Firm* — The Farrell Law Firm, P.C.

(57) ABSTRACT

A transmitter and method are provided for processing a transmission signal. The transmitter includes an FEM that switches a plurality of band signals for a first and second communication scheme, wherein the band signals for the first communication scheme include a first HB signal, a second HB signal, a first LB signal, and a second LB signal, and the band signals for the second communication scheme include a third LB and a third HB signal; a first PAM including a first power amplifier that amplifies the third HB signal, a second power amplifier that amplifies the first HB signal, and a third power amplifier that amplifies the first LB signal; and a second PAM including a fourth power amplifier that amplifies the third LB signal, a fifth power amplifier that amplifies the second HB signal, and a sixth power amplifier that amplifies the second LB signal.

20 Claims, 10 Drawing Sheets

(56) References Cited

U.S. PATENT DOCUMENTS

| | | |
|---|---|---|
| 2010/0291888 A1 | 11/2010 | Hadjichristos et al. |
| 2011/0158081 A1 | 6/2011 | Wang et al. |
| 2012/0049953 A1 | 3/2012 | Khlat |
| 2012/0149313 A1 | 6/2012 | Roh |
| 2013/0099866 A1 | 4/2013 | Conradi |
| 2014/0028391 A1 | 1/2014 | Morris et al. |
| 2014/0073371 A1 | 3/2014 | Mujtaba et al. |
| 2014/0315597 A1* | 10/2014 | Periyalwar .......... H04W 76/026 455/552.1 |
| 2015/0133067 A1* | 5/2015 | Chang ................... H04B 1/48 455/78 |

* cited by examiner

Intra-band aggregation
contiguous Carriers

Frequency A            Frequency B

FIG.6A

Intra-band aggregation
non-contiguous Carriers

Frequency A            Frequency B

FIG.6B

Inter-band
carrier aggregation

Frequency A            Frequency B

TRANSMITTER AND METHOD OF PROCESSING TRANSMISSION SIGNALS

PRIORITY

This application claims priority under 35 U.S.C. §119(a) to Korean Application Serial No. 10-2014-0127660, which was filed in the Korean Intellectual Property Office on Sep. 24, 2014, the entire content of which is hereby incorporated by reference.

BACKGROUND

1. Field of the Disclosure

The present disclosure relates generally to a transmitter and, more particularly, to a transmitter that supports a Multi-Mode Multi-Band (MMMB).

2. Description of the Related Art

Generally, a mobile communication service is provided in different communication service schemes around the world and uses multiple frequency bands for each communication service scheme. For example, the different mobile communication service schemes include a Personal Communication Service (PCS), a Digital Cellular System (DCS), a Code Division Multiple Access (CDMA) scheme, a Global System for Mobile communication (GSM)/General Packet Radio Service (GPRS)/Enhanced Data rates for GSM Evolution (EDGE) scheme, a Wide band Code Division Multiple Access (WCDMA) scheme, a Long Term Evolution (LTE) scheme, etc. Further, the CDMA scheme uses frequency bands of 800 MHz, 1800 MHz, and 1900 MHz, while the GSM scheme uses frequency bands of 850 MHz, 900 MHz, 1800 MHz, and 1900 MHz. Additionally, the WCDMA and LTE schemes use frequency bands of 850 MHz, 1900 MHz, and 2000 MHz.

Conventional mobile terminals may be configured to use a signal of one or two frequency bands among the mobile communication services. Therefore, the conventional mobile terminals only use one or two mobile communication services. Accordingly, when a user visits an area providing a different communication service that is not the service the user's mobile terminal is configured to use, e.g., when traveling, the user cannot use the mobile terminal.

As a result, many users desire and many manufacturers are trying to provide a mobile terminal that is capable of receiving all types of mobile communication services around the world.

However, in order for a mobile terminal to use all mobile communication services and frequency bands for each of the services, the mobile terminal should support a Multi-Mode Multi-Band (MMMB).

"Multi-Mode" refers to, for example, a Frequency Division Duplex (FDD) mode according to the WCDMA scheme, a Time Division Duplex (TDD) mode according to the GSM scheme, etc., and "Multi-Band" refers to different frequency bands. For example, a MMMB, which supports the FDD mode and the TDD mode, i.e., two modes as the multi-mode, supports three service bands of WCDMA 2000, WCDMA 1900, and WCDMA 850 as the FDD mode, and also supports four service bands of PCS 1900, DCS 1800, GSM 900, and GSM 850, as the TDD mode may be supported in the mobile terminal. In WCDMA 2000, WCDMA 1900, WCDMA 850, PCS 1900, DCS 1800, GSM 900, and GSM 850, the numbers "2000", "1900", "1800", and "850" signify that each frequency band is 2000 MHz, 1900 MHz, 1800 MHz, and 850 MHz, respectively.

An LTE system, however, applies Carrier Aggregation (CA) technology for supporting a high data transfer rate. In addition, LTE is required to support a Dual Subscriber Identification Module (SIM) Dual Active (DSDA) scheme, which simultaneously uses two communication company lines according to a characteristic of each country. For example, over a large geographic area such as China, a first communication provider provides a service in some areas and a second communication provider provides a service in other areas. Therefore, in order to receive the service from the first communication provider in some areas and receive the service from the second communication provider in other areas, the two communication company lines need to be simultaneously occupied.

Accordingly, a transmitter is needed, which supports MMMB, while considering the CA technology and the DSDA scheme.

In one approach, a transmitter may be implemented by an MMMB Power Amplifier Module (PAM), an additional PAM, and a module in which a Radio Frequency (RF) switch and a duplexer are integrated. However, although the MMMB PAM supports a multi-band, only one band can be operated. Therefore, the CA technology, which should bind multiple bands, cannot be supported.

As another approach, in order to support the CA technology, the MMMB PAM is divided into a Low Band (LB) and a High Band (HB). For example, a band signal output from the MMMB PAM for the LB and a band signal output from the MMMB PAM for the HB are combined, thereby implementing the CA. However, in this approach, to support the DSDA scheme, a separate 2 G PAM needs to be added. Therefore, to support the CA and the DSDA, three separate PAMs are needed. However, to use three or more PAMs requires increased power consumption by the transmitter and more connections for transferring signals, such that the transmitter is less efficient and its construction is more complicated.

SUMMARY

Accordingly, the present disclosure is made to address at least the problems and/or disadvantages described above and to provide at least the advantages described below.

An aspect of the present disclosure is to provide a transmitter that supports MMMB considering the CA technology and the DSDA scheme.

Another aspect of the present disclosure is to provide a method and an apparatus for processing a signal in a transmitter, which supports MMMB considering the CA technology and the DSDA scheme.

Another aspect of the present disclosure is to provide a transmitter with a simplified structure by minimizing a number of components of a power amplifier (PA), when an additional 2G PAM is configured for supporting DSDA, where an uplink CA or MMMB PAM are divided into an LB and an HB.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Hereinafter, various embodiments of the present disclosure will be described in detail with reference to the accompanying drawings. Further, in the following description of the present disclosure, detailed descriptions of known functions and configurations incorporated herein will be omitted when they may make the subject matter of the present disclosure unclear. The terms which will be described below are terms defined in consideration of the functions in the present disclosure, and may be different according to users, intentions of the users, or customs. Therefore, the definitions of the terms should be determined based on the contents throughout the specification.

Figure 1A:
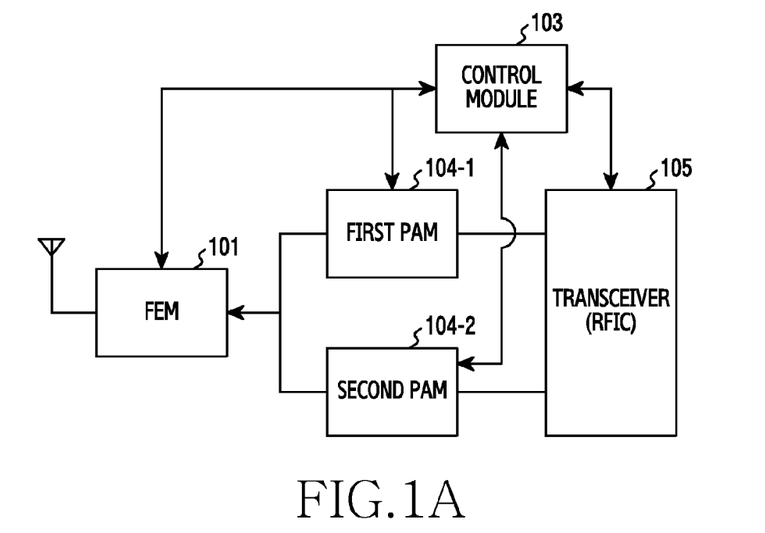
FIG. 1A illustrates a transmitter according to an embodiment of the present disclosure.

FIG. 1A illustrates a transmitter according to an embodiment of the present disclosure.

Referring to FIG. 1A, a transmitter includes a Front End Module (FEM) 101, a control module 103, a first PAM 104-1, a second PAM 104-2, and a transceiver 105. Although illustrated as separate components, at least two of the FEM 101, the control module 103, the first PAM 104-1, the second PAM 104-2, and the transceiver 105 may be implemented by a single hardware device or an Integrated Circuit (IC) chip, and some of the components, for example, the control module 130 may be implemented by a software device.

The FEM 101 is connected with the first PAM 104-1 and the second PAM 104-2, and the first PAM 104-1 and the second PAM 104-2 is connected with the transceiver 105.

The transceiver 105 may transmit and receive wireless signals of a plurality of bands. For example, the transceiver 105 may transmit and receive at least one wireless signal of a 2G band, at least one wireless signal of a 3G band, and at least one wireless signal of a 4G band.

In order to transmit and receive the wireless signal, the transceiver 105 modulates a transmission signal, which is outputted from a baseband modem (not shown), and up-converts the frequency thereof. Thereafter, the transmission signal is transmitted to the first PAM 104-1 or the second PAM 104-2. For example, for a wireless signal of the 2G band, the transmission signal is transmitted to the first PAM 104-1, and for a wireless signal of the 3G/4G band, the transmission signal is transmitted to the second PAM 104-2.

Further, the transceiver 105 demodulates a wireless signal of the 2G band and a wireless signal of the 3G/4G band, which are received through an antenna, and down-converts the frequency thereof, and transmits the down-converted signals to the baseband modem. For example, a plurality of 2G bands may be GSM 850, GSM 900, DCD 1800, PCS 1900 and a 3G band may be a WCDMA band, and a 4G band may be an LTE band.

Each of the first PAM 104-1 and the second PAM 104-2 may include two power amplifiers; a power amplifier for amplifying a power of a 3G/4G band signal and a power amplifier for amplifying a power of a 2G band signal. For example, the first PAM 104-1 may amplify a power of a high band signal of the 3G/4G band, and amplify a high band signal and a low band signal of a first 2G band, for CA. In addition, the second PAM 104-2 may amplify a power of a low band signal of the 3G/4G band, and amplify a high band signal and a low band signal of a second 2G band, for the CA. When signals of the 2G band, e.g., GSM 850, GSM 900, DCS 1800, PCS 1900, etc., are amplified in the first PAM 104-1, signals of a 2G band and another band (e.g., GSM 1700) of the first PAM 104-1 can be amplified in the second PAM 104-2.

The FEM 101 may include an Antenna Switch Module (ASM), a Surface Acoustic Wave (SAW) filter, and an RF switch. The SAW filter is a band pass filter in which a pass bandwidth is narrow, the ASM switches a transmission and reception signal according to a control signal of the control module 103, and the RF switch switches between wireless signals of different bands, e.g., switches a wireless signal of the 2G band and a wireless signal of the 3G/4G band, according to a control signal of the control module 103. For example, the RF switch may be implemented by a duplexer.

The control module 103 may control a configuration parameter of the FEM 101 and the transceiver 105, or control an operation of a power amplifier included in the first PAM 104-1 and the second PAM 104-2 according to a service type.

For example, when a packet data service is performed, a power amplifier for the 3G/4G band of the first PAM 104-1 may be operated and remaining power normally supplied to the other power amplifier of the first PAM 104-1, which is not used, may be blocked. Further, a power amplifier for the 3G/4G band of the second PAM 104-2 may be operated and remaining power normally supplied to the other power amplifier of the second PAM 104-2, which is not being used may be blocked.

When a packet data service is performed, based on the CA, power amplifiers for the 3G/4G bands of the first PAM 104-1 and the second PAM 104-2 may be operated, respectively, and remaining power normally supplied to the other power amplifiers of the first PAM 104-1 and the second PAM 104-2, which are not being used, may be blocked.

When a voice service and a packet data service are simultaneously performed, at least one of the power amplifiers for the 3G/4G band of the first PAM 104-1 and the second PAM 104-2 may be operated and at least one of the power amplifiers for the 2G bands of the first PAM 104-1 and the second PAM 104-2 may be operated. In this event, a power normally supplied to any power amplifier, which is not being used, may be blocked.

When a plurality of voice services are simultaneously performed, the power amplifiers for the 2G bands of the first PAM 104-1 and the second PAM 104-2 may be operated. In this event, a power normally supplied to the power amplifiers of the first PAM 104-1 and the second PAM 104-2, which are not being used, may be blocked.

Figure 1B:
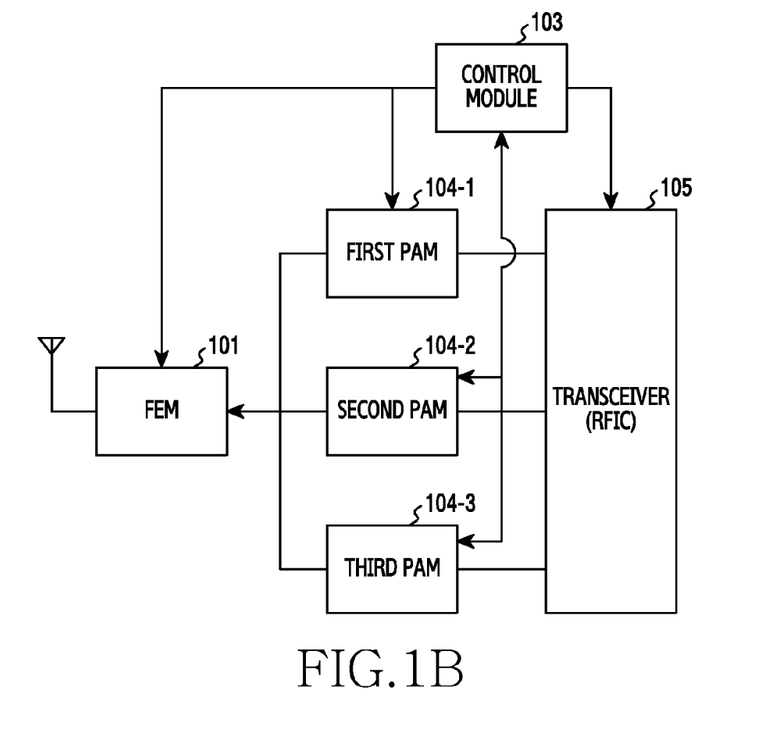
FIG. 1B illustrates a transmitter according to an embodiment of the present disclosure.

FIG. 1B illustrates a transmitter according to an embodiment of the present disclosure.

Referring to FIG. 1B, a transmitter includes an FEM 101, a control module 103, a first PAM 104-1, a second PAM 104-2, a third PAM 104-3, and a transceiver 105. The FEM 101, the control module 103, the first PAM 104-1, the second PAM 104-2, and the transceiver 105 are identical to the FEM 101, the control module 103, the first PAM 104-1, the second PAM 104-2, and the transceiver 105 illustrated in FIG. 1A. The only difference between the transmitter illustrated in FIG. 1A and the transmitter illustrated in FIG. 1B, is that the transmitter illustrated in FIG. 1B includes three PAMs, i.e., the third PAM 104-3.

For example, in FIG. 1A, two PAMs (LTE/3G HB and LTE/3G LB), which amplify the high band signal and the low band signal in the 3G/4G band for supporting the CA are divided into the first PAM 104-1 and the second PAM 104-2, and a power amplifier, which can amplify two 2G band signals (2G HB and 2G LB), is added to each of the first PAM 104-1 and the second PAM 104-2.

However, in FIG. 1B, while two PAMs (LTE/3G HB and LTE/3G LB), which amplify a high band signal and a low band signal in the 3G/4G band for supporting the CA are divided into the first PAM 104-1 and the second PAM 104-2, a power amplifier, which can amplify one 2G band signal (2G HB or 2G LB) is added to each of the first PAM 104-1 and the second PAM 104-2, a new PAM is added, i.e., the third PAM 104-3, which can amplify other 2G band signals (2G HB and 2G LB).

Figure 2:
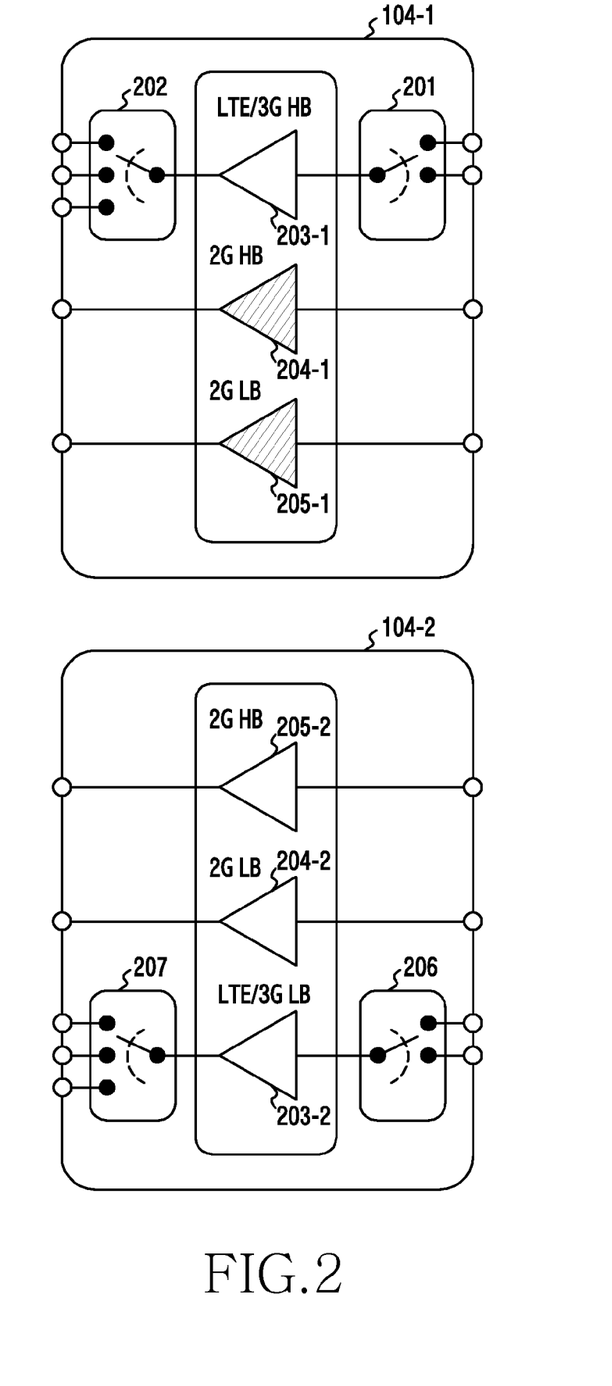
FIG. 2 illustrates PAMs according to an embodiment of the present disclosure.

FIG. 2 illustrates PAMs according to an embodiment of the present disclosure. Specifically, FIG. 2 illustrates an example of the first PAM 104-1 and the second PAM 104-2, as illustrated in FIG. 1A.

Referring to FIG. 2, the first PAM 104-1 includes a first power amplifier 203-1 for amplifying an HB signal of an LTE/3G band, a second power amplifier 204-1 for amplifying an HB signal of a 2G band, a third power amplifier 205-1 for amplifying an LB signal of a 2G band, a first switch 201 that is connected with an input port of the first power amplifier 203-1, and a second switch 202 that is connected with an output port of the first power amplifier 203-1.

Similarly, the second PAM 104-2 includes a fourth power amplifier 203-2 for amplifying an LB signal of an LTE/3G band, a fifth power amplifier 205-2 for amplifying an HB signal of another 2G band, a sixth power amplifier 204-2 for amplifying an LB signal of another 2G band, a first switch 206 that is connected with an input port of the second power amplifier 203-2, and a second switch 207 that is connected with an output port of the fourth power amplifier 203-2.

When a packet data service and voice data are simultaneously provided, a packet data signal may be amplified through the first power amplifier 203-1 of the first PAM 104-1 and the voice data signal may be amplified through one of the fifth power amplifier 205-2 and the sixth power amplifier 204-2 of the second PAM 104-2. Further, the packet data signal may be amplified through the fourth power amplifier 203-2 of the second PAM 104-2 and the voice signal may be amplified through the second power amplifier 204-1 and the third power amplifier 205-1 of the first PAM 104-1.

When the packet service is provided, based on CA, packet data signals may be simultaneously amplified through the first power amplifier 203-1 of the first PAM 104-1 and the fourth power amplifier 203-2 of the second PAM 104-2.

When a plurality of voice services are provided, a first voice signal may be amplified through one of the second power amplifier 204-1 and the third power amplifier 205-1 of the first PAM 104-1, and a second voice signal may be amplified through one of the fifth power amplifier 205-2 and the sixth power amplifier 204-2 of the second PAM 104-2.

Further, when one power amplifier is operated in each of the first PAM 104-1 and the second PAM 104-2, the remaining two power amplifiers of each of the first PAM and the second PAM are not operated, under a control of the control module 103. For example, power is not supplied to the power amplifiers that are not used.

In addition, the first PAM 104-1 and the second PAM 104-2 may each provide an output signal of one power amplifier being used to the FEM 101.

Switch 201 and switch 202, which are connected with the input/output ports of the first power amplifier 203-1 of the first PAM 104-1, and switch 206 and switch 207, which are connected with the input/output ports of the fourth power amplifier 203-2 of the second PAM 104-2, may switch bands.

For example, in switching the bands, the switch 201 or 206 may divide a SAW filter in the FEM 101 into a band that requires passage through the SAW filter and a band that does not require passage through the SAW filter. Because a duplex and a SAW filter included in the FEM 101 are divided into the bands, the switch 202 or 207 can switch the bands considering this. For example, the switch 201 selects either a band that requires filtering or a band that does not, and the selected band is passed to the first amplifier. Thereafter, the switch 202 switches the output of the first amplifier to the filter, to bypass the filter, or to the duplexer.

Figure 3:
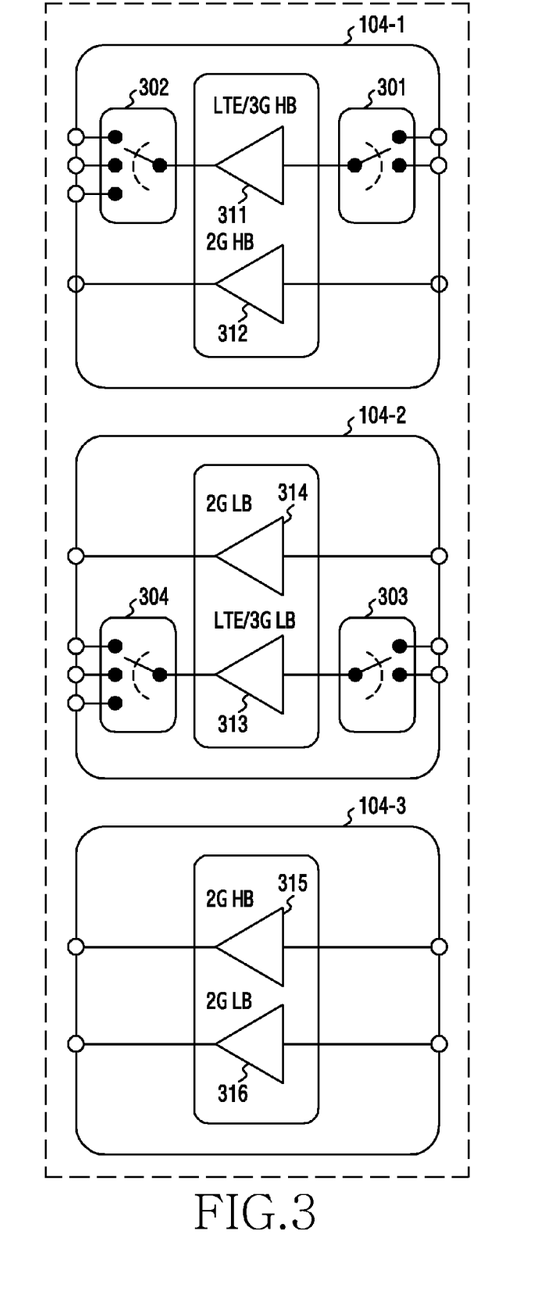
FIG. 3 illustrates PAMs according to an embodiment of the present disclosure.

FIG. 3 illustrates PAMs according to an embodiment of the present disclosure. Specifically, FIG. 3 illustrates an example of the first PAM 104-1, the second PAM 104-2, and the third PAM 104-3, as illustrated in FIG. 1B.

Referring to FIG. 3, a transmitter includes the first PAM 104-1, the second PAM 104-2, and the third PAM 104-3. The first PAM 104-1 includes a first power amplifier 311 for amplifying an HB signal of an LTE/3G band, a second power amplifier 312 for amplifying an HB signal of a 2G band, a first switch 301 that is connected with an input port of the first power amplifier 311 and a second switch 302 that is connected with an output port of the first power amplifier 311.

Similarly, the second PAM 104-2 include a third power amplifier 313 for amplifying an LB signal of an LTE/3G band, a fourth power amplifier 314 for amplifying an LB signal of a 2G band, a first switch 303 that is connected with an input port of the third power amplifier 313, and a second switch 304 that is connected with an output port of the third power amplifier 313.

The third PAM 104-3 includes a fifth power amplifier 315 for amplifying an HB signal of another 2G band and a sixth power amplifier 316 for amplifying an LB signal of another 2G band.

When a packet data service and a voice data are simultaneously provided, a packet data signal may be amplified through the first power amplifier 311 of the first PAM 104-1 and the voice data signal may be amplified through the fourth power amplifier 314 of the second PAM 104-2. Further, the packet data signal may be amplified through the third power amplifier 313 of the second PAM 104-2 and the voice signal may be amplified through the second power amplifier 312 of the first PAM 104-1. In accordance with an embodiment of the present disclosure, a packet data signal may be amplified through one of the first power amplifier 311 of the first PAM 104-1 and the third power amplifier 313 of the second PAM 104-2, and the voice signal may be amplified through one of the fifth power amplifier 315 and the sixth amplifier 316 of the third PAM 104-3.

When the packet service is provided, based on CA, packet data signals may be simultaneously amplified through the first power amplifier 311 of the first PAM 104-1 and the third power amplifier 313 of the second PAM 104-2.

When a plurality of voice services are provided, a first voice signal may be amplified through one of the second power amplifier 312 of the first PAM 104-1 and the fourth power amplifier 314 of the second PAM 104-2, and a second voice signal may be amplified through one of the fifth power amplifier 315 and the sixth power amplifier 316 of the third PAM 104-3.

Further, when one power amplifier is operated in each of the first PAM 104-1, the second PAM 104-2, and the third PAM 104-3, the other power amplifier of each of the first PAM 104-1, the second PAM 104-2, and the third PAM 104-3 is not operated, under a control of the control module 103. For example, a power is not supplied to the power amplifiers that are not being used.

In addition, the first PAM 104-1, the second PAM 104-2, and the third PAM 104-3 may each provide an output signal of the one power amplifier being used to the FEM 101.

Switch 301 and switch 302, which are connected with the input/output ports of the first power amplifier 311 of the first PAM 104-1, or switch 303 and switch 304, which are connected with the input/output ports of the third power amplifier 313 of the second PAM 104-2 may switch bands. For example, the switches 301, 302, 303, and 304 may perform functions which are identical to switches 201, 202, 206, and 207 of FIG. 2.

Figure 4:
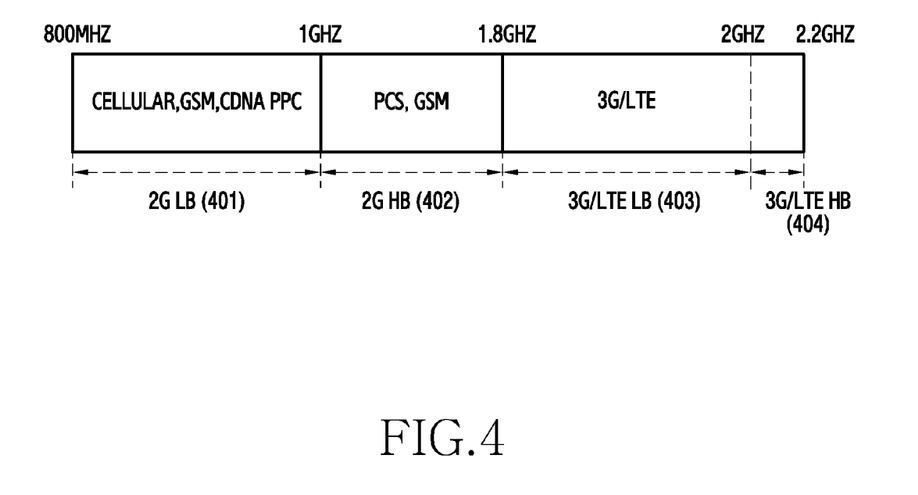
FIG. 4 illustrates an example of dividing a high band and a low band according to an embodiment of the present disclosure.

FIG. 4 illustrates an example of dividing a high band and a low band according to an embodiment of the present disclosure.

Referring to FIG. 4, a 2G band is allocated to and used from an 800 MHz band to a 1.8 GHz band, and a 3G/LTE band is allocated to and used from a 1.8 GHz band to a 2.2 GHz band. In the example, a low band 401 of the 2G band refers to a band from 800 MHz to 1 GHz and a high band 402 of the 2G band refers to a band from 1 GHz to 1.8 GHz. A low band 403 of the 3G/LTE band refers to a band from 1.8 GHz to 2 GHz and a high band 404 of the 3G/LTE band refers to a band from 2 GHz to 2.2 GHz.

The embodiments of the present disclosure are not limited to the example illustrated in FIG. 4, or that the 2G bands are divided into a high band and a low band and the 3G/LTE bands are divided into a high band and a low band, and the high band and the low band of the 2G band and the high band and the low band of the 3G/LTE band may be variously divided according to a frequency operation for each country or provider.

Figure 5:
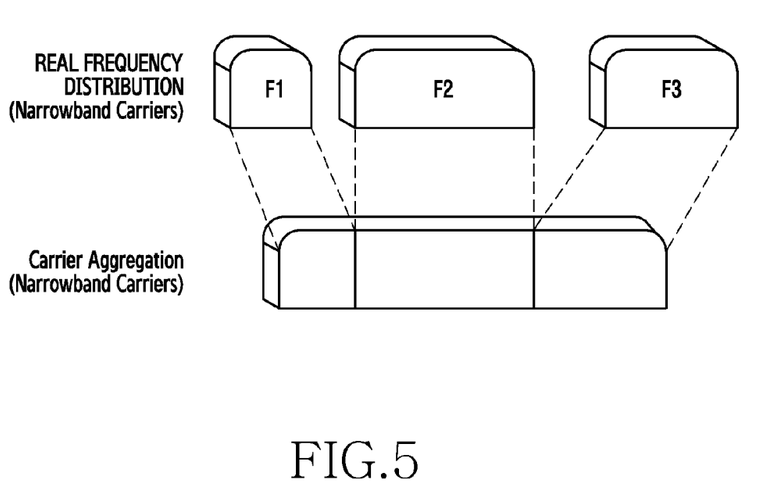
FIG. 5 illustrates a CA concept according to an embodiment of the present disclosure.

FIG. 5 illustrates a CA concept according to an embodiment of the present disclosure.

Referring to FIG. 5, the CA technology combines narrowband carriers F1, F2, and F3 with a virtual broadband carrier. Herein, a bandwidth corresponding to the F1, a bandwidth corresponding to the F2, and a bandwidth corresponding to the F3 may be successively arranged or be non-successively arranged. In addition, the bandwidth corresponding to the F1, the bandwidth corresponding to the F2, and the bandwidth corresponding to the F3 may have identical sizes or have different sizes of bandwidths.

Figure 6A:
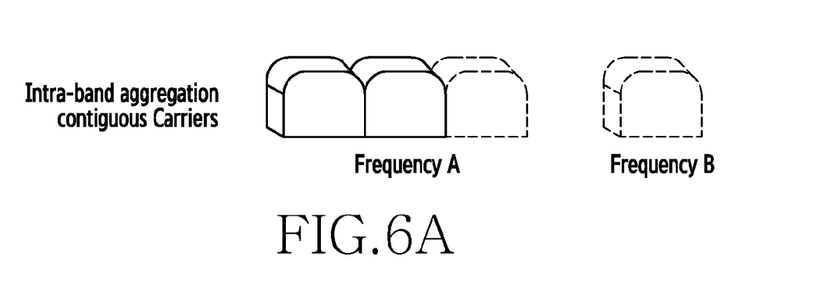
FIGS. 6A to 6C illustrate types of CAs according to an embodiment of the present disclosure.
Figures 6B, 6C:
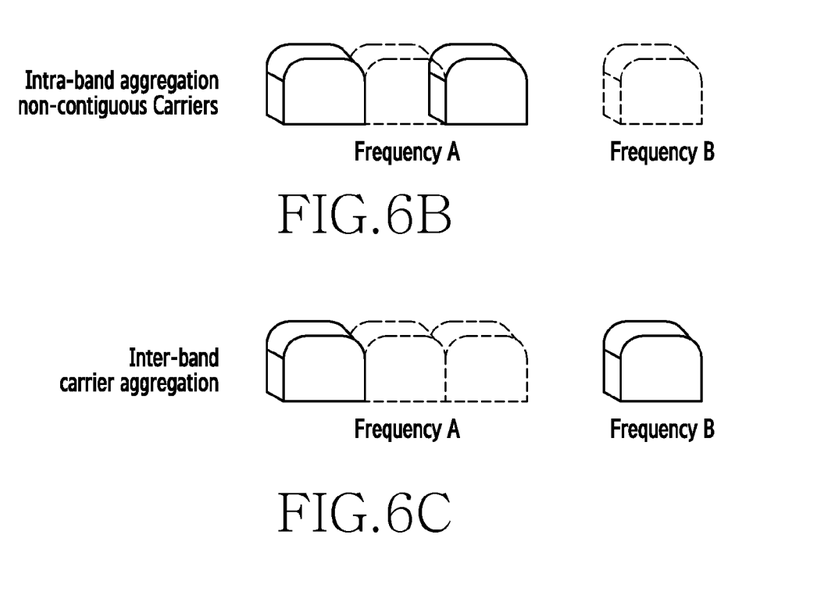

FIGS. 6A to 6C illustrate types of CAs according to an embodiment of the present disclosure. Specifically, FIG. 6A illustrates an intra-band contiguous carrier aggregation that connects consecutive carriers in an identical band, FIG. 6B illustrates an intra-band non-contiguous carrier aggregation that connects non-consecutive carriers in an identical band, and FIG. 6C illustrates an inter-band carrier aggregation that connects carriers in a non-identical band.

Figure 7:
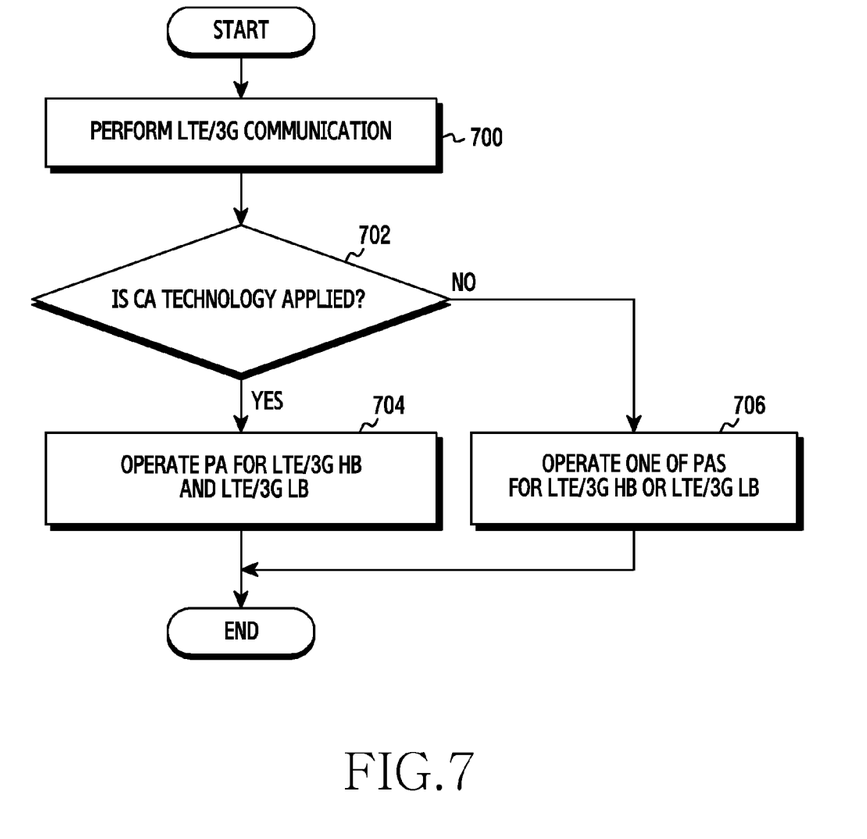
FIG. 7 is a flowchart illustrating a process of controlling a plurality of PAs included in PAMs according to an embodiment of the present disclosure.

FIG. 7 is a flowchart illustrating a process of controlling a plurality of PAs included in PAMs, according to an embodiment of the present disclosure.

Referring to FIG. 7, in step 700, a control module, e.g., the control module 103, performs a packet data service through an LTE/3G communication scheme.

In step 702, the control module determines whether the packet data service is provided through CA.

When the control module determines that the packet data service is performed based on the CA in step 702, the control module simultaneously operates a power amplifier of a first PAM for an LTE/3G HB and a power amplifier of a second PAM for an LTE/3G LB in step 704. At this time, no power is supplied to other power amplifiers of the first and second PAMs, which are not being used.

When the control module determines that the packet data service is not performed based on the CA in step 702, the control module operates the power amplifier of the first PAM for the LTE/3G HB or the power amplifier of the second PAM for the LTE/3G LB in step 706. At this time, no power is supplied to other power amplifiers of the first and second PAMs, which are not being used.

Figure 8:
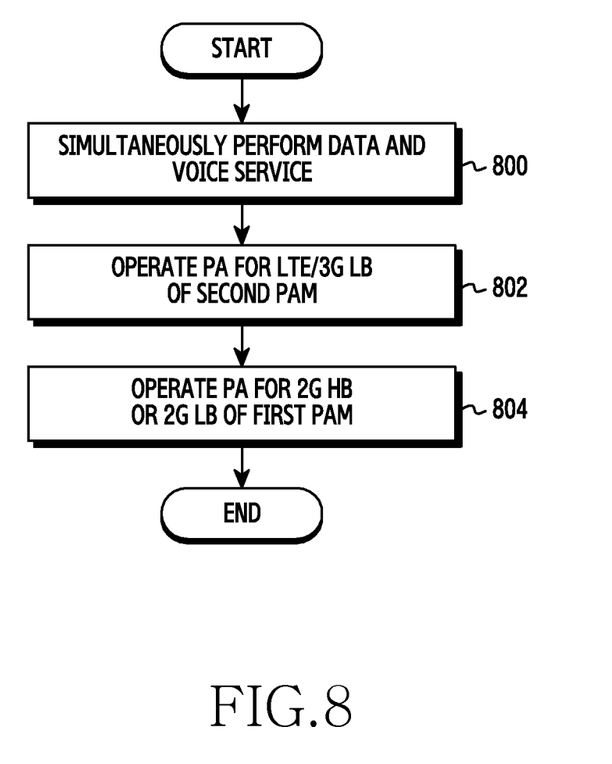
FIG. 8 is a flowchart illustrating a process of controlling a plurality of PAs included in PAMs according to an embodiment of the present disclosure.

FIG. 8 is a flowchart illustrating a process of controlling a plurality of PAs included in PAMs according to an embodiment of the present disclosure.

Referring to FIG. 8, in step 800, a control module, e.g., the control module 103, determines that data and voice services are to be performed simultaneously.

In step 802, the control module operates a power amplifier of a second PAM for an LTE/3G LB for a data service.

In step 804, the control module operates one of power amplifiers of a first PAM for a high band signal or for a low band signal of a 2G band for a voice service.

At this time, no power is supplied to other power amplifiers of the first and second PAMs, which are not being used.

Figure 9:
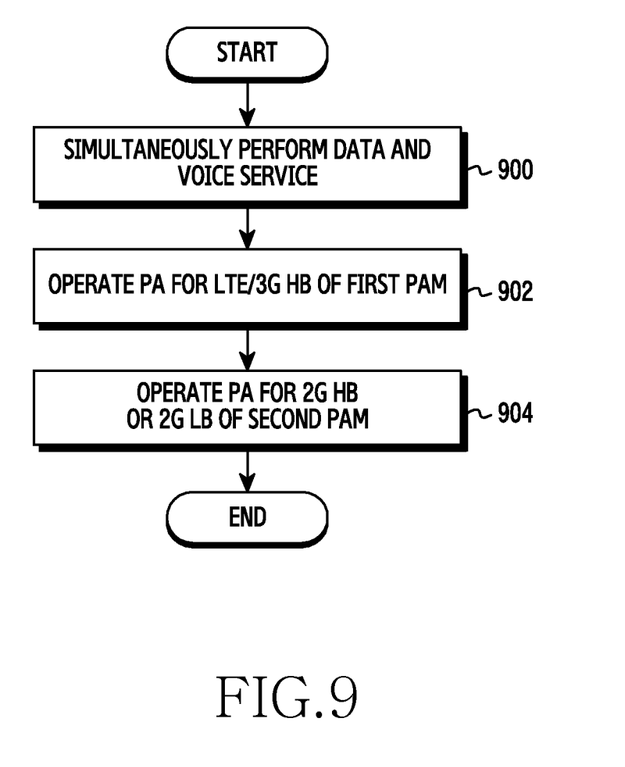
FIG. 9 is a flowchart illustrating a process of controlling a plurality of PAs included in PAMs according to an embodiment of the present disclosure.

FIG. 9 is a flowchart illustrating a process of controlling a plurality of PAs included in PAMs according to an embodiment of the present disclosure.

Referring to FIG. 9, in step 900, a control module, e.g., the control module 103 determines that data and voice services are to be performed simultaneously.

In step 902, the control module operates a power amplifier of a first PAM for an LTE/3G HB for a data service.

In step 904, the control module operates one of power amplifiers of a second PAM for a high band signal or for a low band signal of a 2G band for a voice service.

At this time, no power is supplied to other power amplifiers of the first and second PAMs, which are not being used.

Figure 10:
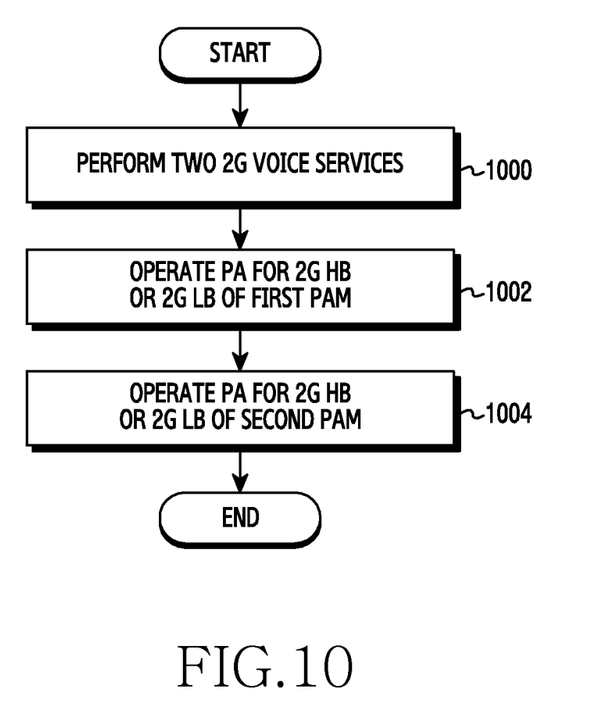
FIG. 10 is a flowchart illustrating a process of controlling a plurality of PAs included in PAMs according an embodiment of the present disclosure.

FIG. 10 is a flowchart illustrating a process of controlling a plurality of PAs included in PAMs according to an embodiment of the present disclosure.

Referring to FIG. 10, in step 1000, a control module, e.g., the control module 103, determines that a plurality of voice services are to be performed simultaneously.

In step 1002, the control module operates one of power amplifiers of a first PAM for a high band signal or for a low band signal of the 2G band for a first voice service.

In step 1004, the control module 103 operates one of power amplifiers of a second PAM for a high band signal or for a low band signal of the 2G band for a second voice service.

At this time, no power is supplied to other power amplifiers of the first and second PAMs, which are not being used.

In accordance with an aspect of the present disclosure, a transmitter is provided, which includes a Front End Module (FEM) that switches a plurality of band signals for a first communication scheme and a plurality of band signals for a second communication scheme, wherein the plurality of band signals for the first communication scheme include a first high band signal, a second high band signal, a first low band signal, and a second low band signal, and the plurality of band signals for the second communication scheme include a third low band signal and a third high band signal; a first Power Amplifier Module (PAM) including a first power amplifier that amplifies the third high band signal, a second power amplifier that amplifies the first high band signal, and a third power amplifier that amplifies the first low band signal; and a second PAM including a fourth power amplifier that amplifies the third low band signal, a fifth power amplifier that amplifies the second high band signal, and a sixth power amplifier that amplifies the second low band signal.

In accordance with another aspect of the present disclosure, a method is provided for processing a transmission signal by a transmitter including a first PAM and a second PAM. The method includes determining a service type of a transmission signal; amplifying the transmission signal using power amplifiers included in the first PAM and the second PAM according to the determined service type; and outputting the amplified transmission signal through an antenna. The first PAM includes a first power amplifier that amplifies a third high band signal among a plurality of band signals for a second communication scheme, a second power amplifier that amplifies a first high band signal among a plurality of band signals for a first communication scheme, and a third power amplifier that amplifies a first low band signal among the plurality of band signals for the first communication scheme, and the second PAM includes a fourth power amplifier that amplifies a third low band signal among the plurality of band signals for the second communication scheme, a fifth power amplifier that amplifies a second high band signal among the plurality of band signals for the first communication scheme, and a sixth power amplifier that amplifies a second low band signal among the plurality of band signals for the first communication scheme.

In accordance with another aspect of the present disclosure, a transmitter is provided, which includes a Front End Module (FEM) that switches a plurality of band signals for a first communication scheme and a plurality of band signals for a second communication scheme, wherein the plurality of band signals for the first communication scheme include a first high band signal, a second high band signal, a first low band signal, and a second low band signal, and the plurality of band signals for the second communication scheme include a third low band signal and a third high band signal; a first Power Amplifier Module (PAM) including a first power amplifier that amplifies the third high band signal and a second power amplifier that amplifies the first high band signal; a second PAM including a third power amplifier that amplifies the first low band signal and a fourth power amplifier that amplifies the third low band signal; and a third PAM including a fifth power amplifier that amplifies the second high band signal, and a sixth power amplifier that amplifies the second low band signal.

In accordance with another aspect of the present disclosure, a method is provided for processing a transmission signal by a transmitter including a first PAM, a second PAM, and a third PAM. The method includes determining a service type of a transmission signal; amplifying the transmission signal using power amplifiers included in the first PAM, the second PAM, and the third PAM according to the determined service type; and outputting the amplified transmission signal through an antenna. The first PAM includes a first power amplifier that amplifies a third high band signal among a plurality of band signals for a second communication scheme, and a second power amplifier that amplifies a first high band signal among a plurality of band signals for a first communication scheme, the second PAM includes a third power amplifier that amplifies a first low band signal among the plurality of band signals for the first communication scheme, and a fourth power amplifier that amplifies a third low band signal among the plurality of band signals for the second communication scheme, and the third PAM includes a fifth power amplifier that amplifies a second high band signal among the plurality of band signals for the first communication scheme, and a sixth power amplifier that amplifies a second low band signal among the plurality of band signals for the first communication scheme.

In accordance with another aspect of the present disclosure, a transmitter comprising a chip set is provided. The chip set is configured to determine a service type of a transmission signal; amplify the transmission signal using power amplifiers included in a first Power Amplifier Module (PAM) and a second PAM according to the determined service type; and output the amplified transmission signal through an antenna. The first PAM includes a first power amplifier that amplifies a third high band signal among a plurality of band signals for a second communication scheme, a second power amplifier that amplifies a first high band signal among a plurality of band signals for a first communication scheme, and a third power amplifier that amplifies a first low band signal among the plurality of band signals for the first communication scheme. The second PAM includes a fourth power amplifier that amplifies a third low band signal among the plurality of band signals for the second communication scheme, a fifth power amplifier that amplifies a second high band signal among the plurality of band signals for the first communication scheme, and a sixth power amplifier that amplifies a second low band signal among the plurality of band signals for the first communication scheme.

In accordance with another aspect of the present disclosure, a transmitter comprising a chip set is provided. The chip set is configured to determine a service type of a transmission signal; amplify the transmission signal using power amplifiers included in a first Power Amplifier Module (PAM), a second PAM, and a third PAM according to the determined service type; and output the amplified transmission signal through an antenna. The first PAM includes a first power amplifier that amplifies a third high band signal among a plurality of band signals for a second communication scheme, and a second power amplifier that amplifies a first high band signal among a plurality of band signals for a first communication scheme. The second PAM includes a third power amplifier that amplifies a first low band signal among the plurality of band signals for the first communication scheme, and a fourth power amplifier that amplifies a third low band signal among the plurality of band signals for the second communication scheme. The third PAM includes a fifth power amplifier that amplifies a second high band signal among the plurality of band signals for the first communication scheme, and a sixth power amplifier that amplifies a second low band signal among the plurality of band signals for the first communication scheme.

As described above, a PA where a high band and a low band are not divided is arranged in an MMMB PAM for a low band and an MMMB PAM for a high band, respectively, so that an effective transmission circuit that supports a DSDA scheme can be provided without an additional power line.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and any equivalents thereof.

What is claimed is:

1. A transmitter comprising:
   a Front End Module (FEM) that switches a plurality of band signals for a first communication scheme and a plurality of band signals for a second communication scheme, wherein the plurality of band signals for the first communication scheme include a first high band signal, a second high band signal, a first low band signal, and a second low band signal, and the plurality of band signals for the second communication scheme include a third low band signal and a third high hand signal;
   a first Power Amplifier Module (PAM) including a first power amplifier that amplifies the third high band signal, a second power amplifier that amplifies the first high band signal, and a third power amplifier that amplifies the first low band signal; and
   a second PAM including a fourth power amplifier that amplifies the third low band signal, a fifth power amplifier that amplifies the second high band signal, and a sixth power amplifier that amplifies the second low band signal.

2. The transmitter of claim 1, further comprising an antenna that transmits the plurality of band signals for the first communication scheme and the plurality of band signals for a second communication scheme, received from the FEM.

3. The transmitter of claim 1, further comprising a transceiver that provides the plurality of band signals for the first communication scheme and the plurality of band signals for the second communication scheme to the first PAM and the second PAM.

4. The transmitter of claim 3, wherein, when the transceiver provides a packet signal and a voice signal, the packet signal is amplified by the first power amplifier of the first PAM and the voice signal is amplified by one of the fifth power amplifier and the sixth power amplifier of the second PAM.

5. The transmitter of claim 3, wherein, when the transceiver provides a packet signal and a voice signal, the packet signal is amplified by the fourth power amplifier of the second PAM and the voice signal is amplified by one of the second power amplifier and the third power amplifier of the first PAM.

6. The transmitter of claim 3, wherein, when the transceiver transmits a packet. signal based on Carrier Aggregation (CA), the packet signal is amplified by the first power amplifier of the first PAM and the fourth power amplifier of the second PAM.

7. The transmitter of claim 3, wherein, when the transceiver transmits a plurality of voice signals, a first voice signal is amplified by one of the second power amplifier and the third power amplifier of the first PAM, and a second voice signal is amplified by one of the fifth power amplifier and the sixth power amplifier of the second PAM.

8. The transmitter of claim 1, wherein, when one power amplifier is operated in each of the first PAM and the second PAM, the remaining two power amplifiers of each of the first PAM and the second PAM are not operated.

9. The transmitter of claim 1, wherein the first PAM and the second PAM provide only an output signal of each power amplifier being operated to the FEM.

10. The transmitter of claim 1, wherein the first PAM further comprises:
    a first switch, connected to an input port of the first power amplifier, that selects the third high band signal as one of a band requiring passage through a band pass filter and a band not requiring passage through the band pass filter; and
    a second switch, connected to an output port of the first power amplifier, that selects one of a passage through the band pass filter, a passage bypassing the band pass filter, and a passage through a duplexer.

11. The transmitter of claim 1, wherein the second PAM further comprises:
    a first switch, connected to an input port of the fourth power amplifier, that selects the third low band signal as one of a band that requires passage through a band pass filter and a band that does not require passage through the band pass filter; and
    a second switch, connected to an output port of the fourth power amplifier, that selects one of a passage through the band pass filter, a passage bypassing the band pass filter, and a passage through a duplexer.

12. The transmitter of claim 1, wherein the first communication scheme includes a 2G communication scheme, and
    wherein the second communication scheme includes at least one of a 3G communication scheme and a 4G communication scheme.

13. A method of processing a transmission signal by a transmitter including a first Power Amplifier Module (PAM), and a second PAM, the method comprising:
    determining a service type of a transmission signal;
    amplifying the transmission signal using power amplifiers included in the first PAM and the second PAM according to the determined service type; and
    outputting the amplified transmission signal through an antenna,
    wherein the first PAM includes a first power amplifier that amplifies a third high band signal among a plurality of band signals for a second communication scheme, a second power amplifier that amplifies a first high band signal among a plurality of band signals for a first communication scheme, and a third power amplifier that amplifies a first low band signal among the plurality of band signals for the first communication scheme, and
    wherein the second PAM includes a fourth power amplifier that amplifies a third low band signal among the plurality of band signals for the second communication scheme, a fifth power amplifier that amplifies a second high band signal among the plurality of band signals for the first communication scheme, and a sixth power amplifier that amplifies a second low band signal among the plurality of band signals for the first communication scheme.

14. The method of claim 13, wherein, when the determined service type is a transmission of a packet signal and a voice signal, amplifying the transmission signal comprises:
    amplifying the packet signal using the first power amplifier of the first PAM; and amplifying the voice signal using one of the fifth power amplifier and the sixth power amplifier of the second PAM.

15. The method of claim 13, wherein, when the determined service type is a transmission of a packet signal and a voice signal, amplifying the transmission signal comprises:
   amplifying the packet signal using the fourth power amplifier of the second PAM; and
   amplifying the voice signal using one of the second power amplifier and the third power amplifier of the first PAM.

16. The method of claim 13, wherein, when the determined service type is a transmission of a packet signal based on Carrier Aggregation (CA), amplifying the transmission signal comprises amplifying the packet signal using the first power amplifier of the first PAM and the fourth power amplifier of the second PAM.

17. The method of claim 13, wherein, when the determined service type is a transmission of a plurality of voice signals, amplifying the transmission signal comprises:
   amplifying a first voice signal using one of the second power amplifier and the third power amplifier of the first PAM; and
   amplifying a second voice signal using one of the fifth power amplifier and the sixth power amplifier of the second PAM.

18. A transmitter comprising:
   a Front End Module (PEM) that switches a plurality of band signals for a first communication scheme and a plurality of band signals for a second communication scheme, wherein the plurality of band signals for the first communication scheme include a first high band signal, a second high band signal, a first low band signal, and a second low band signal, and the plurality of band signals for the second communication scheme include a third low band signal and a third high band signal;
   a first Power Amplifier Module (PAM) including a first power amplifier that amplifies the third high band signal and a second power amplifier that amplifies the first high band signal;
   a second PAM including a third power amplifier that amplifies the first low band signal and a fourth power amplifier that amplifies the third low band signal; and
   a third PAM including a fifth power amplifier that amplifies the second high band signal, and a sixth power amplifier that amplifies the second low band signal.

19. The transmitter of claim 18, further comprising an antenna that transmits the plurality of band signals for the first communication scheme and the plurality of band signals for a second communication scheme, received from the FEM.

20. The transmitter of claim 18, further comprising a transceiver that provides the plurality of band signals for the first communication scheme and the plurality of band signals for the second communication scheme to the first PAM, the second PAM, and the third PAM.

* * * * *

UNITED STATES PATENT AND TRADEMARK OFFICE
CERTIFICATE OF CORRECTION

PATENT NO. : 9,608,673 B2
APPLICATION NO. : 14/864374
DATED : March 28, 2017
INVENTOR(S) : Chang-Joon Park Page 1 of 1

It is certified that error appears in the above-identified patent and that said Letters Patent is hereby corrected as shown below:

In the Claims

Claim 6, Line 2, "packet. signal" should read -- packet signal --

Claim 18, Line 2, "(PEM)" should read -- (FEM) --

Signed and Sealed this
Fifth Day of June, 2018

Andrei Iancu
*Director of the United States Patent and Trademark Office*